(12) United States Patent
Mavroudakis et al.

(10) Patent No.: US 7,513,455 B1
(45) Date of Patent: Apr. 7, 2009

(54) BALLISTIC MISSILE INTERCEPTOR GUIDANCE BY ACCELERATION RELATIVE TO LINE-OF-SIGHT

(75) Inventors: Peter J. Mavroudakis, Hightstown, NJ (US); Jeffrey B. Boka, Lumberton, NJ (US); Joseph T. Corso, Riverton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 370 days.

(21) Appl. No.: 11/062,081

(22) Filed: Feb. 18, 2005

(51) Int. Cl.
  F41G 7/00 (2006.01)
  F42B 15/01 (2006.01)
  F42B 15/00 (2006.01)
(52) U.S. Cl. ............... 244/3.15; 244/3.1; 89/1.11
(58) Field of Classification Search ........... 244/3.1–3.3; 701/300–302, 1, 3–18, 200, 226; 342/62; 89/1.11
See application file for complete search history.

(56) References Cited

U.S. PATENT DOCUMENTS

| | | | | |
|---|---|---|---|---|
| 2,634,414 A | * | 4/1953 | Andrew | 244/3.14 |
| 2,810,533 A | * | 10/1957 | Lauderdale et al. | 244/3.14 |
| 2,903,204 A | * | 9/1959 | Alexander et al. | 244/3.16 |
| 3,223,357 A | * | 12/1965 | Bruecker-Steinkuhl | 244/3.19 |
| 3,603,531 A | * | 9/1971 | Brucker-Steinkuhl | 244/3.16 |
| 3,706,429 A | * | 12/1972 | Welford et al. | 244/3.19 |
| 4,189,116 A | * | 2/1980 | Ehrich et al. | 244/3.16 |
| 4,198,015 A | * | 4/1980 | Yates et al. | 244/3.15 |
| 4,396,878 A | * | 8/1983 | Cole et al. | 244/3.15 |
| 4,456,862 A | * | 6/1984 | Yueh | 244/3.14 |
| 4,492,352 A | * | 1/1985 | Yueh | 244/3.15 |
| 4,494,202 A | * | 1/1985 | Yueh | 701/302 |
| 4,502,650 A | * | 3/1985 | Yueh | 244/3.15 |
| 4,508,293 A | * | 4/1985 | Jones | 244/3.15 |
| 6,254,030 B1 | * | 7/2001 | Sloan et al. | 244/3.21 |
| H1980 H | * | 8/2001 | Cloutier | 342/62 |
| 6,302,354 B1 | * | 10/2001 | Patera | 244/3.15 |

OTHER PUBLICATIONS

A.S. Locke et al, "Principles of Guided Missile Design"; D. Van Nostrand Company, Inc; Princeton, New Jersey, USA; 1995; pp. 475-478.*

* cited by examiner

Primary Examiner—Bernarr E Gregory
(74) Attorney, Agent, or Firm—Duane Morris LLP

(57) ABSTRACT

A method for guiding an intercept vehicle to intercept a ballistic target includes conceptual setup of a line-of-sight (LOS) extending between the vehicles. The interceptor is accelerated in a direction perpendicular to the LOS until its velocity in that direction equals that of the target. At this time, the thrust of the interceptor accelerates it along the line-of-sight, thereby guaranteeing an intercept.

18 Claims, 5 Drawing Sheets

BALLISTIC MISSILE INTERCEPTOR GUIDANCE BY ACCELERATION RELATIVE TO LINE-OF-SIGHT

GOVERNMENTAL INTEREST

This invention was made with government support under Contract/Grant Aegis BMD N00024-98-C-5297. The United States Government has a non-exclusive, non-transferable, paid-up license in this invention.

FIELD OF THE INVENTION

This invention relates to vehicle guidance systems, and more particularly to such guidance systems that are intended to intersect a vehicle, such as an explosive or kinetic kill vehicle, with a moving target.

BACKGROUND OF THE INVENTION

A great deal of attention has been given to the issues relating to missile guidance for destroying stationary or moving targets. During World War II, antiaircraft cannon were operated in a manner that attempted to estimate the future location of an aircraft at the time that a shell would arrive at its altitude and range, and fired at the estimated location. Such antiaircraft artillery would seldom result in the actual striking of an aircraft with the shell, but relied on the fragments from the explosion of the shell to damage or destroy the aircraft.

World War II also saw the introduction of analog-computer control systems for estimating the location of targets, both fixed and moving, and for controlling the aiming of various cannon to fire at a predicted future location of the target. Artillery shells, whether land-based, naval, or airborne, used explosives to increase the likelihood of damage to the target even in the case of a near miss.

With the emergence of ballistic threat missiles, intercept reliance could not be placed on the destructive power of an explosive warhead. The kill vehicle was required instead to actually impact on the target vehicle, thus becoming a kinetic kill vehicle. The guidance systems used for early kinetic-kill vehicles employed extensions of the older techniques. More particularly, the location, speed and acceleration (states) of the target vehicle are sensed, and the future path estimated. The kinetic-kill vehicle is accelerated toward an impact point that is predicted based upon the location, speed and acceleration of the kill vehicle, with the expectation that the kill and target vehicles will collide at the predicted intercept point. One may readily understand that many problems arise in the control and guidance of the kill vehicle under such conditions, not the least of which is the problem of sensing the actual location, speed and acceleration, if any, of the target vehicle, and determining its future path. The acceleration, in turn, of the target vehicle depends upon its rocket or propulsion thrust, its mass, gravity and aerodynamic loading (if not exoatmospheric). Similar considerations apply to the kill vehicle, although its parameters are likely to be under the control of the operator or designers of the kill vehicle.

There have been in the last few years high-profile failures of kill vehicles to intercept their test targets. It has been determined that at least one of the reasons for the failures is that the guidance algorithms assume that the total rocket motor impulse of the kill vehicle and other vehicle parameters are known, thereby providing a mathematical basis to compute a predicted intercept point. However, the rocket motor impulse is not constant, so the thrust, and the mass properties of the kill vehicle, may deviate from the assumed values, with the result that the kill vehicle approaches the predicted intercept point with a speed along its thrust vector that is different than its predicted speed. This difference between the predicted and actual speed may, in turn, result in the kill vehicle arriving at the predicted intercept point either before or after the target vehicle's arrival. This, in turn, results in a miss.

Improved guided missile targeting systems are desired.

SUMMARY OF THE INVENTION

A method according to an aspect of the invention is for intercepting a target, especially a ballistic target, with an interceptor vehicle. The method comprises the steps of setting up a line-of-sight extending between the target and the interceptor vehicle. The interceptor vehicle is initially accelerated in a direction perpendicular to the instantaneous line-of-sight extending between the target and the interceptor vehicle. At a time at which the rotation rate of the line-of-sight as seen at the interceptor is zero, the interceptor is accelerated along the line-of-sight toward the target. In a particularly advantageous mode of this method, the initial acceleration of the interceptor vehicle includes at least a component lying in a plane including the path of the target.

A method according to another aspect of the invention for guiding an interceptor vehicle toward a ballistic target vehicle includes the steps of, at a particular time during the travel of the interceptor vehicle, making a change in the thrust vector of the interceptor vehicle. The method also includes the step, prior to the particular time, of accelerating the interceptor vehicle in a direction perpendicular to an instantaneous line-of-sight extending between the interceptor vehicle and the target. Following the particular time, the interceptor vehicle is accelerated along the line-of-sight toward the target vehicle. In a particularly advantageous mode of this aspect of the invention, the particular time occurs when the velocity of the interceptor vehicle along the direction perpendicular to the line-of-sight equals the velocity of the target vehicle perpendicular to the line-of-sight. This particular time occurs when the line-of-sight as seen from the interceptor vehicle to the target vehicle ceases apparent rotation in space.

The line-of-sight may also be established by data that is developed external to the interceptor vehicle, as for example by computation based on extrinsic sensors, such as for example extrinsic radar or ONIR satellite observations. In other words, the line-of-sight does not have to be observed from the intercept vehicle, but rather it would be observable if there were an observer on the vehicle equipped with suitable instruments.

A method according to another aspect of the invention is for guiding a missile toward a target. The method comprises the steps of determining at least target position, target velocity, missile position, and missile velocity vectors, and generating, from the target position and missile position vectors, a line-of-sight vector representing the line-of-sight between the missile and the target. From the target velocity, missile velocity, and line-of-sight vectors, a signal is generated representing the vector difference between the missile velocity and the target velocity. An orthogonal vector signal is also generated, representing that component of the vector difference that is orthogonal to the line-of-sight vector. The commanded missile thrust vector is generated from the line-of-sight and orthogonal vectors. The commanded missile thrust vector is applied for control of the thrust of the missile.

In one mode of the method of the invention, the step of determining at least target position and target velocity vectors is performed extrinsic to the missile. This mode further comprises the steps of associating time tags with the vectors and synchronizing the target and missile vectors by the use of the time tags. In another mode of the method, the step of generating a line-of-sight vector from the target position and missile position vectors includes the step of generating a line-of-sight unit vector. Also, the step of generating an orthogonal vector signal representing that component of the vector difference that is orthogonal to the line-of-sight vector includes the step of generating an orthogonal vector signal representing that component of the vector difference that is orthogonal to the line-of-sight unit vector.

In a further mode of this method, the step of applying the commanded missile thrust vector for control of the thrust of the missile includes the step of applying the commanded missile thrust vector to an error detector for comparison with actual missile thrust.

DESCRIPTION OF THE INVENTION

Figure 1:
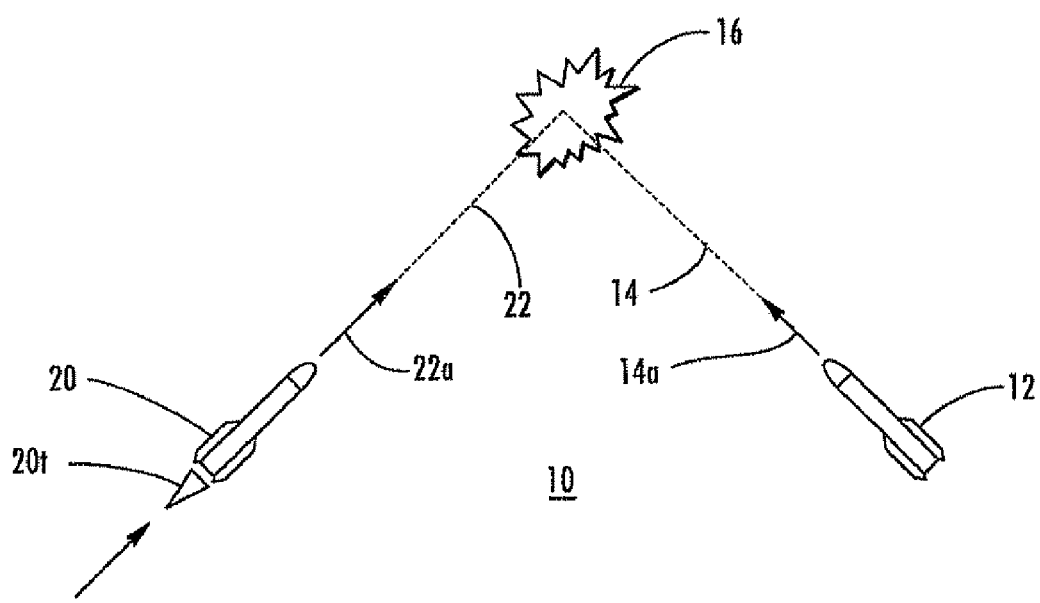
FIG. 1 is a simplified illustration of a prior-art guidance scheme for causing an intercept vehicle to intercept a target vehicle.

FIG. 1 illustrates a prior art guidance arrangement 10 in which a target vehicle 12 moves in a ballistic path 14 in the direction of arrow 14a toward a predicted intercept point 16. An interceptor vehicle or missile 20 generates thrust 20t in a direction which causes acceleration of the interceptor vehicle 20 along a path illustrated as 22, in a direction indicated by arrow 22a, toward the predicted intercept point 16. As mentioned, variables that are required for an intercept but are difficult to account for include the rocket engine impulse and the mass of the intercept vehicle.

According to an aspect of the invention, a "Jet Thrust Control" (JTC) intercept vehicle or missile guidance control algorithm operates by assuming, before rocket motor ignition of the intercept vehicle, that the missile-heading vector is contained within some bound, but that the intercept vehicle and the ballistic target vehicle are not on a collision course. There is therefore a finite or non-zero interceptor-to-target relative velocity component that is orthogonal to the instantaneous line-of-sight extending between the missile and the target. This has the effect, over time, of causing the line-of-sight to appear to rotate in space as seen from the missile (and also as seen from the target). The rotation of the line-of-sight, in turn, precludes intercept. According to an aspect of the invention, the missile thrust may be initially, during an early portion of the flight, directed in a direction orthogonal to the instantaneous line-of-sight extending between the missile and the target, so as to reduce the difference between the velocities of the missile and the target orthogonal to the line-of-sight. If performed endoatmospherically, this thrust might result in aerodynamic missile loading attributable to high angles-of-attack; if excessively large, the loading may adversely affect the missile. If performed exoatmospherically, no such aerodynamic effects occur. Eventually, the missile velocity orthogonal to the line-of-sight becomes equal to the velocity of the target. At this time, the line-of-sight as seen at the missile ceases to rotate, and remains fixed in space. Following the time at which the line-of-sight ceases rotation, the missile thrust is directed along the line-of-sight so as to direct the missile toward the target. At this time, the velocities of the missile and the target in a direction perpendicular to the line-of-sight are equal. The only acceleration is that of the missile along the line-of-sight, which does not affect the velocity in the orthogonal plane. The missile thrust is such as to always direct the missile toward the target, and regardless of slight variations in the rocket engine impulse or mass of the missile, the missile will eventually impact on the target.

The JTC missile guidance algorithm does not predict or assume an explicit intercept point or intercept time. The initial thrust is directed orthogonal to the instantaneous line-of-sight in order to null the relative missile-to-target velocity in this direction. Functionally, this puts the missile on an intercept course with the target. When this condition is realized, all the remaining missile velocity or acceleration can be directed along the line-of-sight in order to cause the intercept to occur earlier than it otherwise would. In other words, the intercept condition is maintained by nulling the velocity difference perpendicular to the line-of-sight, and then simply increases missile speed toward the target and the intercept point.

Figure 2A:
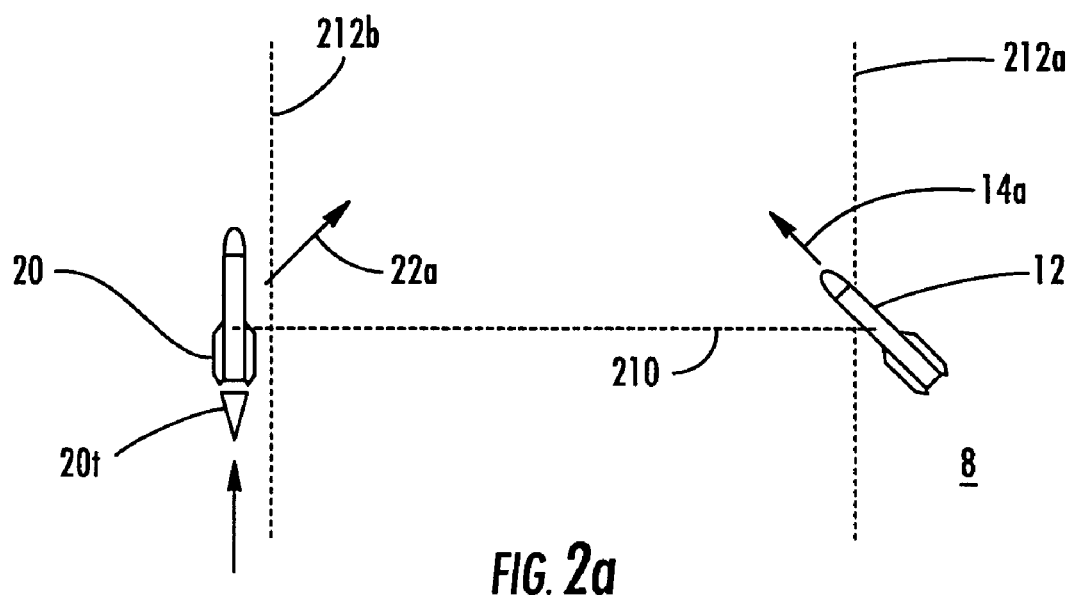
FIG. 2a is a simplified representation of target and interceptor motion prior to achieving an intercept trajectory according to an aspect of the invention.
Figure 2B:
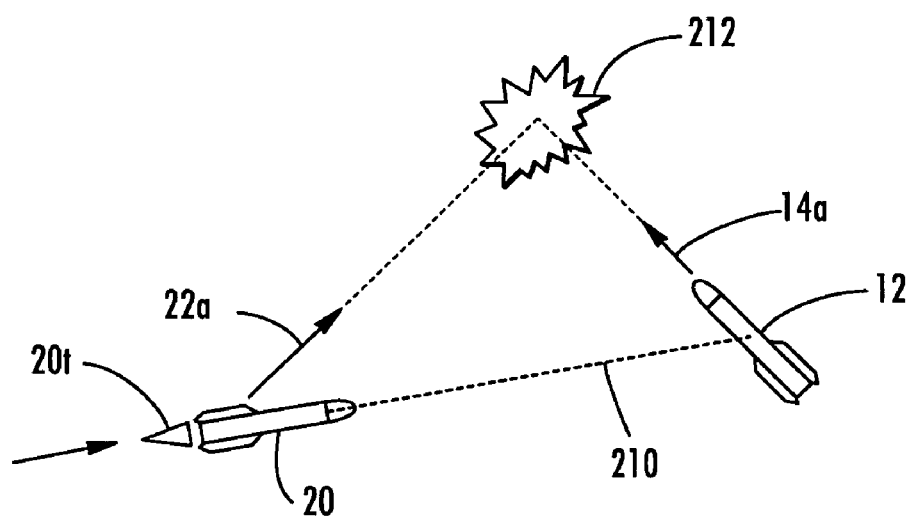
FIG. 2b is a corresponding representation at a time after achieving an intercept trajectory.

FIG. 2a is a simplified diagram illustrating intercept vehicle or missile acceleration and velocity relative to a target during an initial phase of the guidance prior to the time at which an intercept trajectory is established, and FIG. 2b illustrates the conditions during a later stage of the guidance, after the intercept trajectory is established. In FIG. 2a, interceptor missile 20 has thrust 20t for propelling the missile in a direction 22a, which is orthogonal to an instantaneous line-of-sight 210 extending between the interceptor missile 20 and the target vehicle 12. As mentioned, the line-of-sight 210 rotates in space as seen from the interceptor missile so long as the velocity components in the plane orthogonal to the line-of-sight 210 are not equal. If the line-of-sight (LOS) rotation rate in inertial space is zero, and the range rate is negative (range difference between interceptor and target is diminishing), then intercept is assured. Having equal velocities in the direction orthogonal to LOS is the same as having LOS rate equal to zero, guaranteeing intercept for ballistic target vehicles. In FIG. 2a, a first plane 212a extending perpendicular to the instantaneous line-of-sight 210 passes through the target missile 12, and a second plane 212b, also perpendicular to the instantaneous line-of-sight 210, passes through the interceptor missile 20. When the components of target velocity 14a and interceptor missile velocity 22a in planes 212a and 212b, respectively, are equal, the two vehicles are moving parallel to each other at the same speed in the illustrated plane of FIG. 2a (that is, the plane of the illustration).

At a later time than that illustrated in FIG. 2a, after the rotation of the line-of-sight has been nulled or reduced to zero, the thrust vector 20t of the interceptor missile is adjusted, or other action is taken, to accelerate the interceptor missile 20 along line-of-sight 210 toward the target vehicle, as illustrated in FIG. 2b. Since the two vehicles are moving at the same velocity in the plane perpendicular to the non-rotating line-of-sight, the interceptor missile will eventually impact the target vehicle. Differences between the actual and estimated or assumed rocket engine impulse of the interceptor vehicle merely increase or reduce the time to intercept, but cannot cause a missed intercept.

The JTC guidance algorithm commands the missile's thrust vectoring system in the form of a unit vector. This unit vector identifies or specifies a direction in inertial space in which to direct the engine thrust. The unit vector takes the form $$\hat{\mu}_{thrust} = K \cdot \Delta \hat{V}_\perp + \sqrt{1-K^2} \cdot \hat{\mu}_{LOS} \quad (1)$$

where:

$\Delta \hat{V}_\perp$ is the unit vector of the relative missile-to-target velocity component that is orthogonal to the instantaneous line-of-sight extending between the target and the missile;

$\hat{\mu}_{LOS}$ is the unit vector along the instantaneous missile-to-target line-of-sight; and K is a weighting factor for burning along, or orthogonal to, the line-of-sight ($0 <= K <= 1$).

Initially, at rocket motor ignition of the interceptor missile, K=1, and all thrust is directed orthogonal to the line-of-sight (LOS). As the relative velocity component orthogonal to the LOS diminishes, K approaches 0, and thrust is redirected along the line-of-sight. This change may be gradual or abrupt. A gradual transition is generally preferred. The salient point is that at or near the beginning of interceptor flight, the thrust vector is directed transverse to the LOS, and toward or at the end of flight, the thrust vector is directed along the LOS.

As part of an evaluation of a missile guidance system for Aegis Ballistic Missile Defense program, guidance algorithms for the third-stage operation of a typical interceptor missile were analyzed to determine sensitivity to rocket motor impulse variations. Burnout-referenced guidance, as described by Cordes, J. E., "Burnout Referenced Guidance," published in the Hughes Missile Systems Company Technical Memorandum TM-41-2-205.46-1, Feb. 3, 1994, was compared with the Jet Thrust Control invention herein, and also with "Optimal Midcourse Guidance", as described in "Optimal Midcourse Guidance Law for Fixed-Interval Propulsive Maneuvers," by M. A. Massoumia, published in the Journal of Guidance, Control, and Dynamics, Vol. 18, No. 3, 1995, pp. 465-470.

For the case of JTC guidance according to an aspect of the invention, the following mechanization was used for calculating the guidance weighting factor referenced to rocket motor ignition at time t=0

$$K(t) = \frac{\|\Delta V_\perp(t)\|}{\|\Delta V_\perp(0)\|} \quad (2)$$

where $\|\Delta V \perp (t)\|$ is the vector magnitude of the relative missile-to-target velocity component that is orthogonal to the instantaneous line-of-sight at time t.

The metric used to evaluate guidance algorithm performance is zero effort miss (ZEM), which means the missile-to-target miss distance if no guidance effort is used beyond the third-stage (or last-stage, if other than three boost stages are used) rocket motor burnout. A typical exoatmospheric ballistic target intercept scenario was used for this evaluation. For all simulations, noise sources were disabled in order to evaluate ideal performance. Additionally, a constant-gravity model was used so that missile-target differential compensation is not needed. Two methods were used for varying the rocket motor total impulse. In a first method (Method 1), burn time was maintained at its nominal level while thrust level was varied. In Method 2, thrust level was maintained at its nominal value while the burn time was varied.

Figure 3:
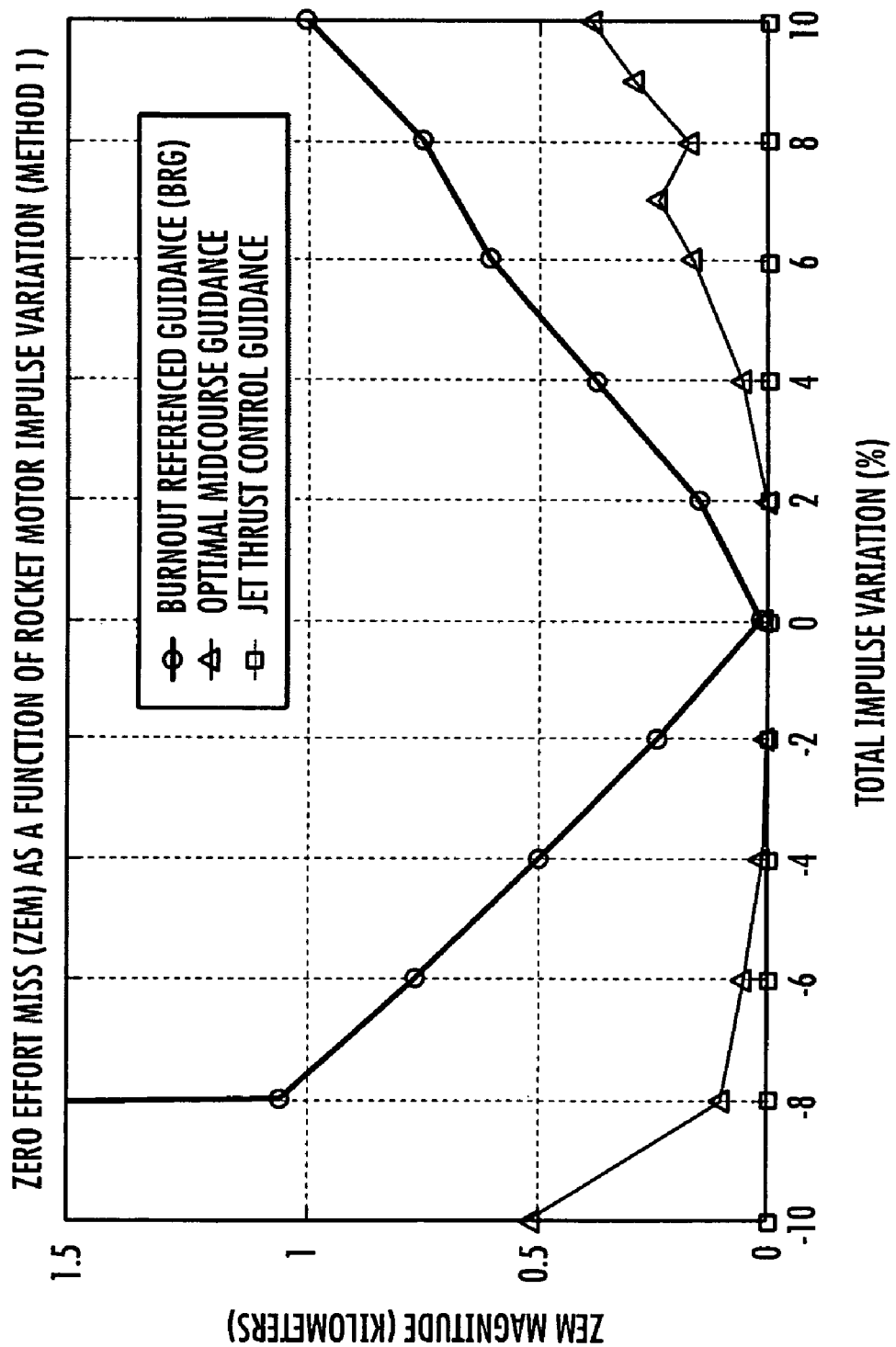
FIG. 3 plots zero-effort miss (ZEM) as a function of rocket motor impulse variation by thrust variation with nominal burn time for prior-art guidance systems and for the invention.
Figure 4:
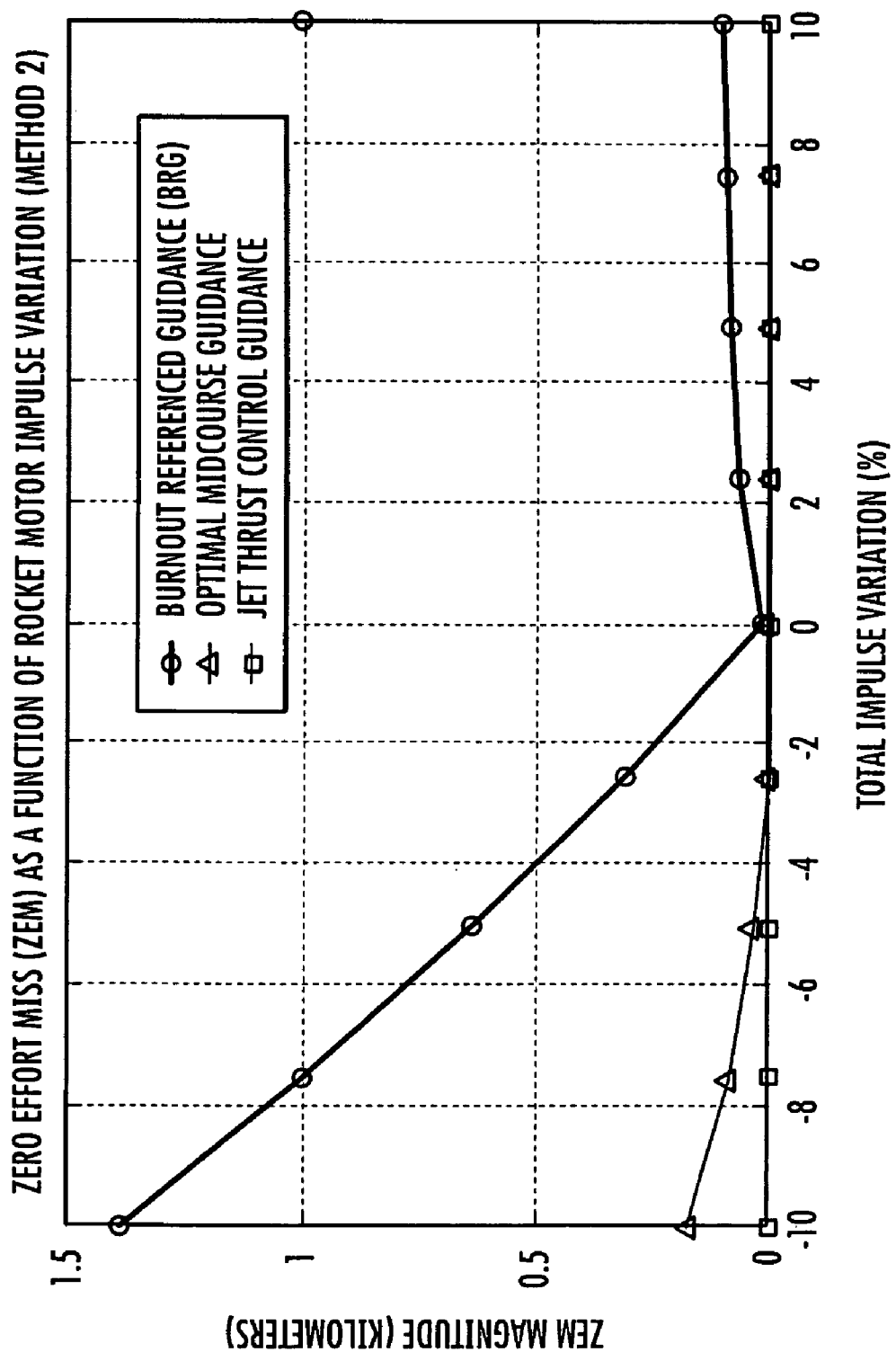
FIG. 4 plots zero-effort miss (ZEM) as a function of rocket motor impulse variation by variation of burn time with constant thrust for prior-art guidance systems and for the invention.

FIGS. 3 and 4 illustrate Zero Effort Miss (ZEM) plotted in kilometers as a function of total impulse variation in percent (%) for methods 1 and 2, respectively, with the guidance system as a parameter. All of the guidance systems produce a zero kilometer ZEM in the absence of rocket motor impulse variations. However, only the Jet Thrust Control (JTC) guidance according to an aspect of the invention has zero kilometer (km) ZEM for finite values of impulse variation. More particularly, FIG. 3, for impulse variation by variation of thrust with constant burn time, illustrates a plot of the prior-art Burnout Referenced Guidance, which shows as much as a 1 kilometer ZEM as a function of 8% impulse variation. The prior-art "Optimal Midcourse Guidance" plot of FIG. 3 is somewhat better, showing as much as approximately 0.2 km ZEM for the same impulse variation. The JTC control according to the invention shows zero-distance ZEM at all impulse variations up to 10%. It is highly desirable for a successful intercept that the value of ZEM equals zero as intercept approaches.

The plots of FIG. 4, for impulse variation by means of constant thrust but variable burnout time, also show the JTC control to be better than either of the prior-art control techniques, but the variations are not as pronounced as in FIG. 3. The ZEM for positive impulse variations is less than for negative impulse variations because when there is an excess of impulse the guidance system can tolerate greater errors; less impulse (negative variations) implies a tail chase between the interceptor and the target resulting in asymmetrical performance.

Figure 5:
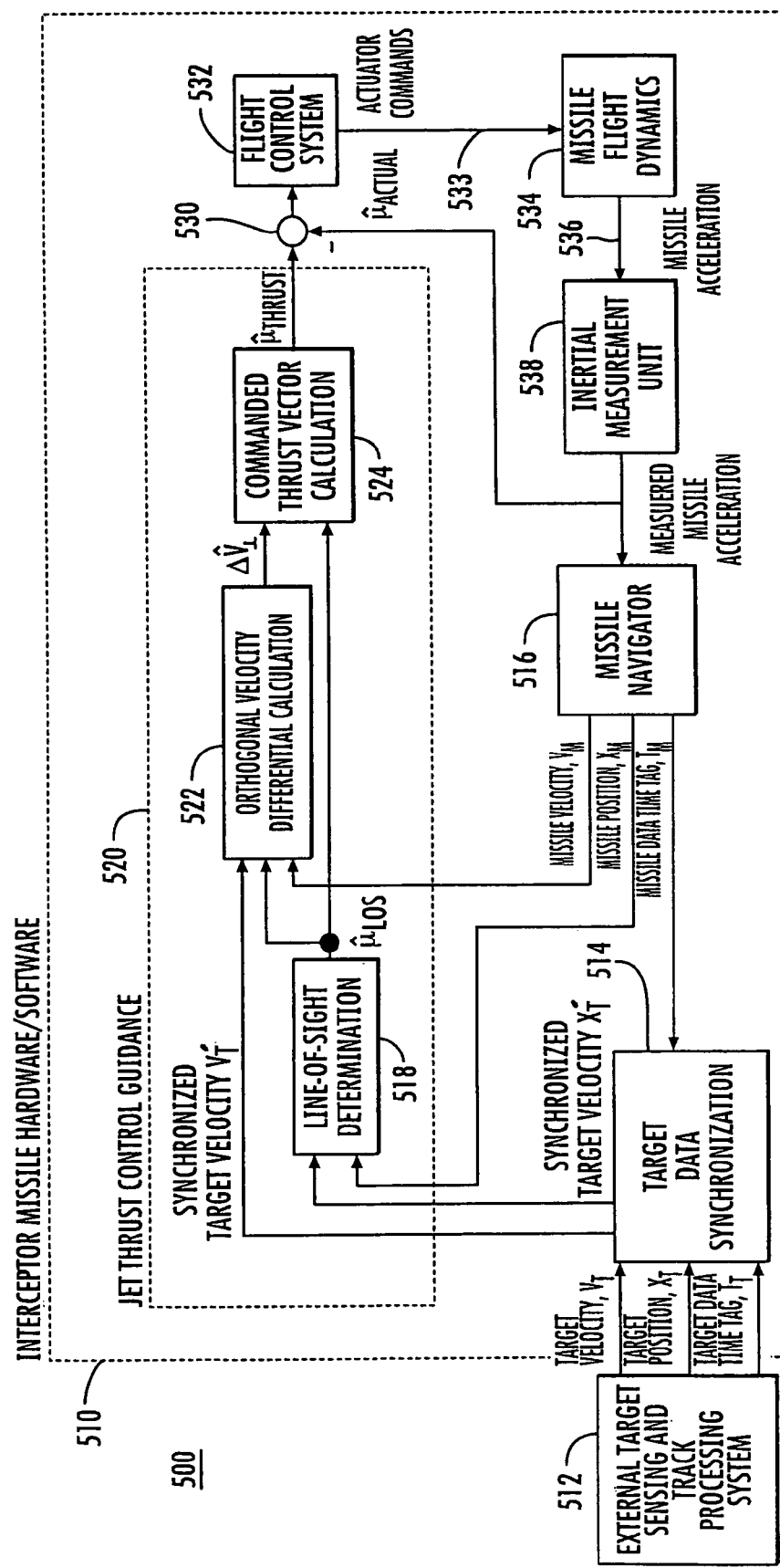
FIG. 5 is a simplified top-level guidance, navigation and control block diagram for an interceptor missile incorporating jet thrust control guidance according to an aspect of the invention.

FIG. 5 illustrates a simplified top-level guidance, navigation, and control block diagram for an interceptor missile incorporating jet thrust control (JTC) guidance according to an aspect of the invention. In FIG. 5, a system 500 includes interceptor missile hardware and software represented as a block 510, which receives target sensing and tracking information from an external processing system. The fundamental data required by JTC are the time-synchronized velocity and position vectors of the missile and target. The required sensing and tracking information, including target velocity vector $V_T$, target position vector $X_T$, and target data time tag $T_T$, is coupled from external target sensing and track processing system 512 to a block 514 in "missile" 510. The missile velocity vector $V_M$ and position vector $X_M$, and data time tag $T_M$, are provided by a missile navigation system, illustrated as a block 516. Block 514 synchronizes the target data with the missile data by use of a missile time tag $T_M$ applied from missile navigation block 516.

In the simplified embodiment of FIG. 5, it is presumed that the time latency of the missile data with respect to "real time" is infinitesimal. However, the time latency of the target data could be substantial depending primarily on the data transmission pathway. Therefore, a data synchronization function, represented as a block 514, is used to propagate the target velocity and position vectors from the target data time tag to the missile data time tag. In order to do this, it is assumed that the target is ballistic and flying in a low atmospheric drag environment such that propagation based solely on gravitational acceleration and Coriolis effects is possible. In an alternate implementation, missile data could also be provided by an external system. In this situation, propagation of the missile velocity and position vectors in the synchronization function must account for missile acceleration due to thrust.

The "first" operation performed by JTC in the arrangement of FIG. 5 is to apply the position vectors $X_M$ and $X_T'$ of the missile and target, respectively, to a line-of-sight determination block 518 of the JTC guidance system 520. Block 518 determines the line-of-sight unit vector, $\hat{\mu}_{LOS}$, from the missile to the target. The $\hat{\mu}_{LOS}$ is applied to an Orthogonal Velocity Differential Calculation block 522 together with the missile velocity $V_M$ and the synchronized target velocity $V_T'$. The $\hat{\mu}_{LOS}$ is also applied to a Commanded Thrust Vector Calculation block 524. Orthogonal Velocity Differential Calculation block 522 calculates the vector difference, $\Delta V_{MT}$, between the missile velocity $V_M$ and the target velocity $V_T'$, and determines the component of this vector difference that is orthogonal to the line-of-sight unit vector. The unit vector, $\Delta \hat{V}_\perp$, of this orthogonal component is also calculated. The unit vector $\Delta \hat{V}_\perp$ is applied to Commanded Thrust Vector Calculation block 524. Block 524 determines the desired missile thrust direction, $\hat{\mu}_{thrust}$, as a function of $\hat{\mu}_{LOS}$ and $\Delta \hat{V}_\perp$. The desired missile thrust direction $\hat{\mu}_{thrust}$ is applied from JTC Guidance system 520 to conventional interceptor missile control hardware and software 510. More particularly, the $\hat{\mu}_{thrust}$ is applied to a noninverting (+) port of a differencing circuit or error detector 530.

Error detector 530 of FIG. 5 receives $\hat{\mu}_{thrust}$ at its noninverting input port and the actual missile thrust vector $\hat{\mu}_{actual}$ (sensed by the missile's inertial measurement unit 538) at its inverting (−) input port. The error signal or difference between the desired thrust vector, $\hat{\mu}_{thrust}$, and the actual thrust vector $\hat{\mu}_{actual}$, as generated by error detector 530, is fed to the missile's flight control system, represented as a block 532. The output of the flight control system 532 is generated on a line represented as 533 in the form of actuator commands. Block 532 updates actuator commands to actuators (for example, a thrust vectoring actuator) in order to ultimately null the difference between $\hat{\mu}_{thrust}$ and $\hat{\mu}_{actual}$. The actuator commands to the control surfaces or elements of the missile control system affect the missile flight dynamics (block 534). The resulting missile acceleration is expressed through the missile flight dynamics 534 and is coupled by the physics of the system to be measured by the missile's inertial measurement unit 538. Missile acceleration is then integrated by the navigation function 516 to produce missile velocity and position vectors. Those skilled in the art of control systems will readily recognize that the missile thrust vector commands $\hat{\mu}_{thrust}$ applied to error detector 530 are acted upon so as to tend to null the difference between the thrust vector commands $\hat{\mu}_{thrust}$ and the actual missile thrust vector $\hat{\mu}_{actual}$ in conventional feedback manner. Thus, the commands produced by the Jet Thrust Control Guidance system 520 of FIG. 5 are translated into corresponding motion of the missile.

The line-of-sight (LOS) between interceptor and target can be established by either radar systems integrated into the ship or surface units that launched the interceptor, or optical systems integrated on-board the interceptor. In each of these systems, there are computers that process the radar (or optical) data to determine the LOS and LOS rate.

Other embodiments of the invention will be apparent to those skilled in the art. For example, while the designation of the inventive system herein uses the word "jet," implying propulsion by reaction to a stream of gas or fluid, types of engines other than turbojets, fanjets, ramjets, and scramjets can be used, including rockets and ion thrusters.

A method according to an aspect of the invention is for intercepting a ballistic target (12) with an interceptor vehicle (20). The method comprises the steps of setting up a line-of-sight (210) extending between the ballistic target (12) and the interceptor vehicle (20). The interceptor vehicle (20) is initially accelerated in a direction perpendicular to the instantaneous line-of-sight (210) extending between the target (12) and the interceptor vehicle (20). At a time at which the rotation rate of the line-of-sight as seen at the interceptor is zero, the interceptor is accelerated along the line-of-sight (210) toward the target (12). In a particularly advantageous mode of this method, the initial acceleration of the interceptor vehicle (20) includes at least a component lying in a plane (8) including the path of the target.

A method according to another aspect of the invention for guiding an interceptor vehicle (20) toward a ballistic target vehicle (12) includes the steps of, at a particular time (equality of velocity perpendicular to the line-of-sight) during the travel of the interceptor vehicle (20), making a change in the thrust vector of the interceptor vehicle (20). The method also includes the step, prior to the particular time, of accelerating the interceptor vehicle (20) in a direction perpendicular to an instantaneous line-of-sight (210) extending between the interceptor vehicle (20) and the target (12). Following the particular time, the interceptor vehicle (20) is accelerated along the line-of-sight (210) toward the target vehicle (12). In a particularly advantageous mode of this aspect of the invention, the particular time occurs when the velocity of the interceptor vehicle along the direction perpendicular to the line-of-sight equals the velocity of the target vehicle perpendicular to the line-of-sight. This particular time corresponds to the time at which the line-of-sight as seen from the interceptor vehicle to the target vehicle ceases apparent rotation in space.

The line-of-sight may also be established by data which is developed external (512) to the interceptor vehicle (510), as for example by computation based on extrinsic sensors, such as for example extrinsic radar or ONIR satellite observations. In other words, the line-of-sight does not have to be observed from the intercept vehicle, but rather it would be observable if there were an observer on the vehicle.

A method according to another aspect of the invention is for guiding a missile (20, 510) toward a target (12). The method comprises the steps of determining at least target position ($X_T$), target velocity ($V_T$), missile position ($X_M$), and missile velocity ($V_M$) vectors, and generating, from the target position ($X_T$) and missile position ($X_M$) vectors, a line-of-sight vector $\hat{\mu}_{LOS}$, representing the line-of-sight between the missile (20, 510) and the target (12). From the target velocity ($V_T$), missile velocity ($V_M$), and line-of-sight vectors $\hat{\mu}_{LOS}$, a signal is generated, $\Delta V_{MT}$, representing the vector difference between the missile velocity ($V_M$) and the target velocity ($V_T$). An orthogonal unit vector signal $\Delta \hat{V}_\perp$ is also generated, representing the direction of that component of the vector difference, $\Delta V_{MT}$, which is orthogonal to the line-of-sight vector $\hat{\mu}_{LOS}$. The commanded missile thrust vector $\hat{\mu}_{thrust}$ is generated from the line-of-sight and orthogonal vectors $\hat{\mu}_{LOS}$ and $\Delta \hat{V}_\perp$, respectively. The commanded missile thrust vector $\hat{\mu}_{thrust}$ is applied for control of the thrust (530, 532, 533, 534, 536, 538) of the missile (20, 510).

In one mode of the method of the invention, the step of determining at least target position ($X_T$) and target velocity ($V_T$) vectors is performed extrinsic to the missile (20, 510). This mode further comprises the steps of associating time tags ($T_T$) with the vectors and synchronizing (block 514) the target (512) and missile (20, 510) vectors by the use of the time tags. In another mode of the method, the step of generating a line-of-sight vector $\hat{\mu}_{LOS}$ from the target position ($X_T$) and missile position ($X_M$) vectors includes the step of generating a line-of-sight unit vector. Also, the step of generating an orthogonal vector signal $\Delta \hat{V}_\perp$ representing that component of the velocity vector difference that is orthogonal to the line-of-sight vector includes the step of generating an orthogonal vector signal representing that component of the velocity vector difference that is orthogonal to the line-of-sight unit vector $\hat{\mu}_{LOS}$.

In a further mode of this method, the step of applying the commanded missile thrust vector $\hat{\mu}_{thrust}$ for control of the thrust of the missile (20, 510) includes the step of applying the commanded missile thrust vector $\hat{\mu}_{thrust}$ to an error detector (530) for comparison with actual missile thrust $\hat{\mu}_{actual}$.

What is claimed is:

1. A method for intercepting a ballistic target vehicle with an interceptor vehicle, said method comprising the steps of:
   setting up a line-of-sight between the target vehicle and the interceptor vehicle;
   initially accelerating said interceptor vehicle in a direction perpendicular to said line-of-sight whereby the acceleration tends to reduce apparent rotation in space of the line-of-sight as seen from the interceptor vehicle;
   at a time at which the rotation rate of said line-of-sight as seen at said interceptor vehicle is zero, accelerating said interceptor along said line-of-sight toward said target vehicle; and
   intercepting the target vehicle with the interceptor vehicle.

2. A method according to claim 1, wherein said initial acceleration includes at least a component lying in a plane including the path of said target.

3. A method according to claim 1, wherein said step of setting up a line-of-sight between the target and the interceptor vehicle includes the step of setting up an instantaneous line-of-sight between the ballistic target vehicle and the interceptor vehicle.

4. A method for guiding an interceptor vehicle toward a target vehicle, said method comprising the steps of:
   at a particular time during the travel of said interceptor vehicle, making a change in the thrust vector of said interceptor vehicle;
   prior to said particular time, accelerating said interceptor vehicle in a direction perpendicular to a line-of-sight extending between said interceptor vehicle and said target vehicle; and
   following said particular time, accelerating said interceptor vehicle along said line-of-sight toward said target vehicle.

5. A method according to claim 4, wherein said particular time occurs when the velocity of said interceptor vehicle along said direction perpendicular to said line-of-sight equals the velocity of said target vehicle along said direction perpendicular to said line-of-sight.

6. A method according to claim 4, wherein said particular time occurs when said line-of-sight as seen from said interceptor vehicle ceases to rotate.

7. A method for guiding an interceptor vehicle toward a target, said method comprising the steps of:
   determining at least target position, target velocity, interceptor vehicle position, and interceptor vehicle velocity vectors;
   generating, from said target position and interceptor vehicle position vectors, a line-of-sight vector representing the line-of-sight between said interceptor vehicle and said target;
   generating, from said target velocity, interceptor vehicle velocity, and line-of-sight vectors, a signal representing the vector difference between the interceptor vehicle velocity and the target velocity, and also generating an orthogonal vector signal representing that component of the vector difference which is orthogonal to said line-of-sight vector;
   generating, from said line-of-sight and orthogonal vectors, a desired missile thrust vector; and
   controlling the thrust of said interceptor vehicle by applying said desired interceptor vehicle thrust vector; and
   intercepting the target with the interceptor vehicle.

8. A method according to claim 7, wherein said step of determining at least target position, and target velocity vectors is performed extrinsic to said interceptor vehicle, and further comprising the steps of:
   associating time tags with said vectors; and
   synchronizing said target and interceptor vehicle vectors by the use of said time tags.

9. A method according to claim 7, wherein said step of generating, from said target position and interceptor vehicle position vectors, a line-of-sight vector, includes the step of generating a line-of-sight unit vector; and
   said step of generating an orthogonal vector signal representing that component of the vector difference which is orthogonal to said line-of-sight vector includes the step of generating an orthogonal vector signal representing that component of the vector difference which is orthogonal to said line-of-sight unit vector.

10. A method according to claim 7, wherein said step of controlling the thrust of said interceptor vehicle includes the step of applying said desired interceptor vehicle thrust vector to an error detector for comparison with actual interceptor vehicle thrust.

11. A method according to claim 7, wherein said step of generating, from said target position and interceptor vehicle position vectors, a line-of-sight vector, includes the step of generating a line-of-sight unit vector; and
   said step of generating an orthogonal vector signal representing that component of the vector difference which is orthogonal to said line-of-sight vector includes the step of generating an orthogonal vector signal representing that component of the velocity vector difference which is orthogonal to said line-of-sight unit vector.

12. A method according to claim 7, wherein said step of controlling the thrust of said interceptor vehicle involves accelerating the interceptor vehicle in a direction perpendicular to said line-of-sight whereby acceleration tends to reduce apparent rotation in space of the line-of-sight as seen from the interceptor vehicle and puts the interceptor vehicle on an intercept course or trajectory immediately at the completion of nulling the rotation rate of the line-of-sight as seen at the interceptor vehicle.

13. A method for directing an interceptor vehicle toward a ballistic target, said method comprising the steps of:
   defining an instantaneous line-of-sight extending between the locations of said target and said interceptor vehicle;
   initially accelerating said interceptor vehicle in a direction perpendicular to said instantaneous line-of-sight between said target and said interceptor vehicle, which tends to reduce apparent rotation in space of said instantaneous line-of-sight;
   at a time at which said rotation rate of said line-of-sight at said interceptor is zero, accelerating said interceptor vehicle along said line-of-sight toward said target; and
   intercepting the target with the interceptor vehicle.

14. A method for guiding an interceptor vehicle toward a target, said method comprising the steps of:
   determining at least target position, target velocity, interceptor vehicle position, and interceptor vehicle velocity vectors;

generating, from said target position and interceptor vehicle position vectors, a line-of-sight vector representing the line-of-sight between said interceptor vehicle and said target;

generating, from said target velocity, interceptor vehicle velocity, and line-of-sight vectors, a signal representing the vector difference between the interceptor vehicle velocity and the target velocity, and also generating an orthogonal vector signal representing that component of the velocity vector difference which is orthogonal to said line-of-sight vector;

generating, from said line-of-sight and orthogonal vectors, a desired interceptor vehicle thrust vector; and controlling the thrust of said interceptor vehicle by applying said desired interceptor vehicle thrust vector; and intercepting the target with the interceptor vehicle.

15. A method according to claim 14, wherein said step of determining at least target position, and target velocity vectors is performed extrinsic to said interceptor vehicle, and further comprising the steps of:

associating time tags with said vectors; and synchronizing said target and interceptor vehicle vectors by the use of said time tags.

16. A method according to claim 14, wherein said step of generating, from said target position and interceptor vehicle position vectors, a line-of-sight vector, includes the step of generating a line-of-sight unit vector; and said step of generating an orthogonal vector signal representing that component of the velocity vector difference which is orthogonal to said line-of-sight vector includes the step of generating an orthogonal vector signal representing that component of the velocity vector difference which is orthogonal to said line-of-sight unit vector.

17. A method according to claim 14, wherein said step of controlling the thrust of said interceptor vehicle includes the step of applying said desired interceptor vehicle thrust vector to an error detector for comparison with actual interceptor vehicle thrust.

18. A method according to claim 14, wherein said step of controlling the thrust of said interceptor vehicle involves accelerating the interceptor vehicle in a direction perpendicular to said line-of-sight whereby acceleration tends to reduce apparent rotation in space of the line-of-sight as seen from the interceptor vehicle and puts the interceptor vehicle on an intercept course or trajectory immediately at the completion of nulling the rotation rate of the line-of-sight as seen at the interceptor vehicle.

\* \* \* \* \*

UNITED STATES PATENT AND TRADEMARK OFFICE
CERTIFICATE OF CORRECTION

| | | |
|---|---|---|
| PATENT NO. | : 7,513,455 B1 | Page 1 of 1 |
| APPLICATION NO. | : 11/062081 | |
| DATED | : April 7, 2009 | |
| INVENTOR(S) | : Peter J. Mavroudakis et al. | |

It is certified that error appears in the above-identified patent and that said Letters Patent is hereby corrected as shown below:

Column 1, line 8, please correct the following: "N00024-98-C-5297" should be --N00024-98-C-5197--.

Signed and Sealed this

Seventh Day of February, 2012

David J. Kappos
*Director of the United States Patent and Trademark Office*